US008898131B1

(12) United States Patent
Jiang et al.

(10) Patent No.: US 8,898,131 B1
(45) Date of Patent: Nov. 25, 2014

(54) CLICK-THROUGH RATE ADJUSTMENTS

(75) Inventors: Yankang Jiang, Winchester, MA (US); Jian Huang, Woburn, MA (US); Qi Gu, Burlington, MA (US)

(73) Assignee: Supermedia LLC, DFW Airport, TX (US)

( * ) Notice: Subject to any disclaimer, the term of this patent is extended or adjusted under 35 U.S.C. 154(b) by 1773 days.

(21) Appl. No.: 12/031,098

(22) Filed: Feb. 14, 2008

Related U.S. Application Data

(60) Provisional application No. 60/889,874, filed on Feb. 14, 2007, provisional application No. 60/889,828, filed on Feb. 14, 2007, provisional application No. 60/889,830, filed on Feb. 14, 2007.

(51) Int. Cl.
*G06F 17/30* (2006.01)

(52) U.S. Cl.
USPC .......................................................... 707/706

(58) Field of Classification Search
USPC ......... 707/672, 673, 697, 699, 706, 708–711, 707/713, 715, 722, 723, 731, 732, 737, 763, 707/777, 778, 786, 796, E17.008, 14, 17, 707/44, 45, 64, 69, 101, 107, 108, 116, 117, 707/133–137, 739–755, 769–771, 797–802, 707/828–830
See application file for complete search history.

(56) References Cited

U.S. PATENT DOCUMENTS

| | | | | |
|---|---|---|---|---|
| 2003/0033292 | A1 * | 2/2003 | Meisel et al. | 707/3 |
| 2003/0149937 | A1 * | 8/2003 | McElfresh et al. | 715/517 |
| 2005/0076014 | A1 | 4/2005 | Agarwal et al. | |
| 2005/0080772 | A1 | 4/2005 | Bem | |
| 2005/0097024 | A1 | 5/2005 | Rainey | |
| 2005/0144069 | A1 | 6/2005 | Wiseman et al. | |

* cited by examiner

*Primary Examiner* — Hosain Alam
*Assistant Examiner* — Reza Hosseini
(74) *Attorney, Agent, or Firm* — Bejin Bieneman PLC

(57) ABSTRACT

A set of preliminary search results is retrieved based on a search query, the set of search results including a plurality of pay-per-click listings. A normalized click-through rate is calculated for each pay-per-click listing in the set of preliminary search results, the normalized click-through rate being based on an actual click-through rate that is adjusted according to one or more positions in which the pay-per-click listing was previously provided in one or more sets of final search results. The plurality of pay-per-click listings is ordered based on the calculated normalized click-through rates.

20 Claims, 4 Drawing Sheets

Listings 125

| Id | Advertiser | Region | Category | Description | Full Text | Keywords | Date Added | Hyperlink |
|---|---|---|---|---|---|---|---|---|
| 1 | Company1 | 1 | Restaurants | Justin's Deli | Check o... | food, deli | 1/7/2004 | http://ww. |
| 2 | Company1 | 34 | Restaurants | Pizza Place | Be sure... | pizza, food | 2/5/2005 | http://ww. |
| 3 | Company2 | 1 | Restaurants | Yum's | Yums is.. | food | 1/7/2004 | http://ww. |
| 4 | Company1 | 1 | Restaurants | Pappas Pizza | We have. | pizza, pappas | 2/5/2005 | http://ww. |
| 5 | Company2 | 2 | Restaurants | Pizza To Go! | Go get y.. | food, takeout | 11/30/3006 | http://ww. |
| 6 | Company2 | 2 | Restaurants | Taco Place | Mmmmm. | food, taco | 12/2/2007 | http://ww. |
| 7 | Company1 | 2 | Restaurants | Family Dining | Somethin. | food, dining | 2/5/2005 | http://ww. |
| 8 | Company3 | 2 | Restaurants | Fast Pizza | 5 mins or. | pizza, fast | 12/23/2006 | http://ww. |

Figure 3

Search Results 130

| Id | Address | Keywords | Location | Category | Date | Time | Set ID | Listings | Selected |
|---|---|---|---|---|---|---|---|---|---|
| 78 | 192.168 ... | NY, deli | 1 | Restaurants | 1/7/2007 | 12:45:16 | 5765 | 1, 65 ... | 1 |
| 79 | 10.107 ... | LA, pizza | 34 | Restaurants | 2/5/2007 | 1:55:37 | 3295 | 2, 72 ... | 72, 55 |
| 80 | 172.16 ... | refinance, ... | 99 | Finance | 2/7/2007 | 18:12:55 | 5 | 105, 23 ... | 77 |
| 81 | 192.168 ... | boat loans | 52 | Finance | 2/13/2007 | 13:01:09 | 7 | 9, 19 ... | 9, 19, 22 ... |
| 82 | 10.10.37 ... | LCD, tv, review | 54 | Electronics | 2/15/2007 | 6:15:22 | 22 | 97, 78 ... | 97, 53 ... |

Figure 4

CLICK-THROUGH RATE ADJUSTMENTS

CROSS-REFERENCE TO RELATED APPLICATIONS

This application claims the benefit of U.S. provisional applications Ser. Nos. 60/889,874 (entitled "ADVERTISING METHOD"), 60/889,830 (entitled "OPTIMIZED BIDDING SYSTEM"), and 60/889,828 (entitled "CLICK-THROUGH RATE NORMALIZATION"), all filed Feb. 14, 2007, and all hereby incorporated by reference in their entireties. This application is also related to the following co-pending U.S. patent applications that are commonly owned with, and filed the same day as, the present application: Ser. No. 12/031,028, entitled "ORGANIZING SEARCH RESULTS;" and Ser. No. 12/031,124, entitled "OPTIMIZED BIDDING FOR PAY-PER-CLICK LISTINGS." The foregoing related applications are fully incorporated herein by reference in their entireties.

BACKGROUND

Applications known as "search engines" are widely available on computer networks such as intranets and the Internet, including the World Wide Web. Search engines typically enable users to locate desired content, web sites, etc. Users indicate key words of interest, and a search engine responds with search results, and may also provide listings from advertisers. Search engines often charge advertisers to have their listings included in a set of search results. In pay-per-click (PPC) listings, an advertiser only pays the search engine advertising fee when a user selects, e.g., clicks on, the listing. The position of a PPC listing in a set of search results, e.g., second in a set of five listings, may be determined according to a bid amount, i.e., an amount that an advertiser is willing to pay upon a user selection of the listing.

From the standpoint of being selected by a user, it is generally advantageous for a listing to be placed in a higher position, e.g., first as opposed to fourth in a set of five listings, because users often follow a tendency to select listings that are placed higher. Nonetheless, regardless of where they are placed in a set of search results, some listings may be more or less likely to be selected by a user than other listings. Thus, it would be desirable for a search engine to be able to generate additional revenue by providing listings that are more likely than other listings to be selected by a user.

BRIEF DESCRIPTION OF THE DRAWINGS

FIG. 3 illustrates an exemplary set of listings.

FIG. 4 illustrates an exemplary set of search log entries.

DETAILED DESCRIPTION OF PREFERRED EMBODIMENTS

Figure 1:
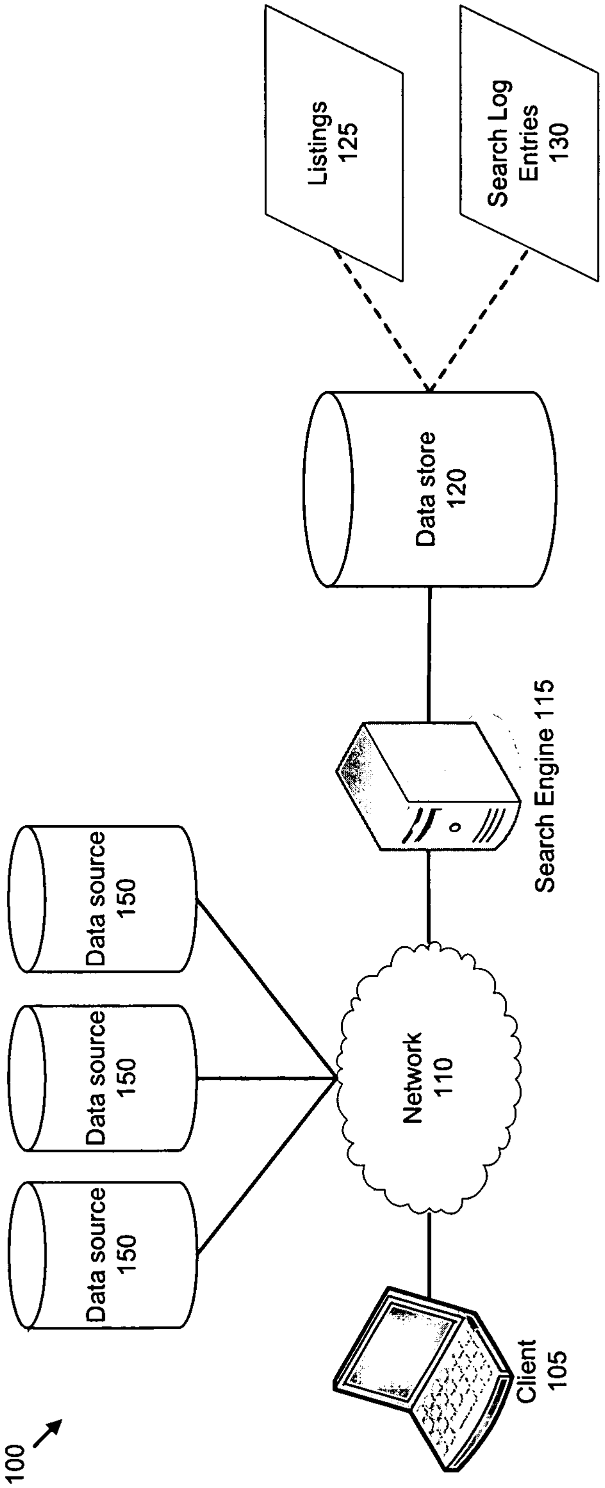
FIG. 1 illustrates an exemplary information distribution system that includes a client in selective communication with a search engine via a network.

FIG. 1 illustrates an exemplary information distribution system 100 that includes a client 105 in selective communication with a search engine 115 via a network 110. Search engine 115 also selectively communicates with a data store 120, possibly through network 110, but more likely though a local area network (LAN), or the like (not shown in FIG. 1). Although shown as included in separate computing devices in FIG. 1, search engine 115 and data store 120 may be included within a single computing device, or may each include clusters of computing devices for purposes of redundancy, processing efficiency, etc. In any event, data store 120 may include a plurality of listings 125 and a plurality of search log entries 130. It should be understood that various embodiments of system 100 may include a variety of components, information types, interactions, etc., including, but in no way limited to those mentioned herein.

Client 105 allows a user to communicate through network 110, e.g., to interact with search engine 115. Client 105 may be any one of a number of computing devices that include one or more software applications for facilitating such communications. For example, client 105 may be a desktop computer, a laptop computer, a mainframe computer, a mini-computer, a cell phone, a personal digital assistant, an internet-enabled set-top box, or other similar device. Also, while only one client 105 is shown in FIG. 1, many different clients 105 may submit queries and receive responses from using system 100.

Client 105 may submit a query to search engine 115 via network 110. Network 110 may include any medium or media capable of transmitting data between client 105 and search engine 115, such as the Internet, a local area network, a wide area network, a cellular network, etc. Search engine 115 may accept a query submitted by client 105 and may in turn query data store 120. Search engine 115 may be any device or combination of devices configured to receive information from one or more clients 105, and to in turn communicate with data store 120. For example, search engine 115 may be a server computer, a query server, a web server, a search server, a mainframe, a computing cluster, or the like.

Search engine 115 may include one or more web servers, which may facilitate access to client 105. Accordingly, search engine 115 may provide client 105 with a graphical user interface (GUI) such as a web page, hypertext markup language (HTML) page or the like. Such GUIs are typically accessible through a web browser or a client application that is included within client 105. Further, client 105 may display other kinds of user interfaces, such as a text-only interface, or any other interface capable of transmitting queries and receiving query results from search engine 115. Search engine 115 selectively communicates with data store 120.

Data store 120 may include one or more relational databases. Alternatively or additionally, data store 120 may include one or more object-oriented or hierarchical databases, or other mechanisms for storing and accessing data, including arrays, pointers, flat files, etc. As mentioned above, data store 120 may be included in a separate computing device from that hosting search engine 115, or may be a software application executing on a same computing device as search engine 115.

Figure 2:
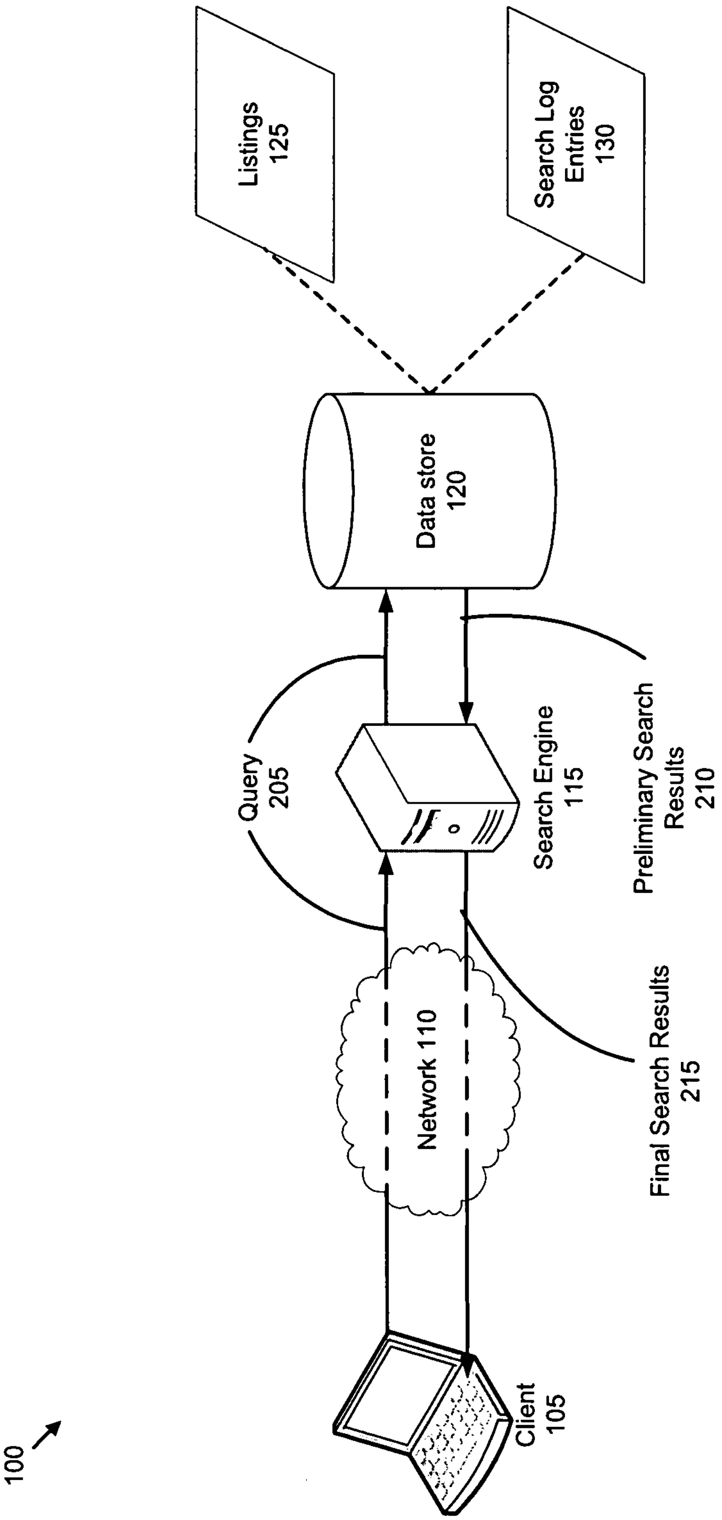
FIG. 2 illustrates an exemplary information distribution system including communication between a client and a search engine via a network.

FIG. 2 illustrates information distribution system 100, and further illustrates communication between client 105 and search engine 115 via network 110. As shown in FIG. 2, client 105 may submit a query 205 to search engine 115 via network 110. Search engine 115 may accept query 205 submitted by client 105 and may in turn query data store 120. Data store 120 may then return a set of preliminary search results 210 to search engine 115. Search engine 115 may then re-package, modify, normalize, and/or perform additional actions on preliminary search results 210 before responding to client 105. For example, as discussed below, search engine 115 may respond to client 105 with a set of final search results 215. Search engine 115 generally attempts to provide client 105 with listings 125 in a set of final search results 215 that are both relevant to query 205, and also likely to be clicked on or otherwise selected by a user. Search engine 115 may also provide data to data store 120 based on the final search results 215, or a user's activity after providing such search results. For example, search engine 115 may provide data to be stored in data store 120, or more specifically, search engine 115 may provide data to be stored in search log entries 130.

It should be noted that query 205 need not be received from client 105. For example, search engine 115 may receive query 205 from another computing device that sends query 205 on behalf of client 105. In addition, search engine 115 may also provide final search results 215 to another computing device that may then forward search results 215 to client 105. For example, client 105 may be a cellular telephone that communicates with a proxy server in a cellular network. The proxy server may communicate with search engine 115 on behalf of client 105, thereby sending and receiving information between client 105 and search engine 115. Generally, search engine 115 provides a set of final search results 215 to client 105 in response to a query 205. Such search results 215 typically include one or more listings 125.

Listings 125 may be stored in data store 120, whereby listings 125 may be updated, deleted, added, accessed, etc. Individual listings 125 may be represented by one or more database records included in data store 120. Each listing 125 generally represents an entity, e.g., a business, school, church, government agency, person, product, etc. Listings 125 may include data such as information from a directory, such as yellow pages or a white pages directory, a directory of content on a network, e.g., pages available on the world wide web, etc. In addition, listings 125 may include advertising information. For example, a listing 125 may include a product advertisement and a hyperlink to a business that sells the product. Further, multiple listings 125 may represent a particular entity.

Data sources 150 typically provide data for listings 125. A data source 150 may be a website, an advertiser, a vendor, a company, a directory, or the like. A variety of known mechanisms for importing data from data sources 150 may be used to create, modify, or remove a listing 125. For example, system 100 may utilize a web crawler or spider to gather data from data sources 150. In addition, data sources 150 may provide data for listings 125 directly to search engine 115, data store 120, or some other computing device. For example, data source 150 may be an advertiser that buys or bids on keywords, pays for a sponsored search result, etc. Data sources 150 may be made available by vendors, and/or listings 125 may be populated by data from computer readable media directly into data store 120, by data entry into data store 120, etc. Because data sources 150 are frequently provided by different parties, listings 125 populated from data sources 150 frequently include different listings 125 representing a single entity, e.g., a school, a church, a business, a government agency, a person, etc. Further, even when listings 125 are populated from a single data source 150, or from data sources 150 provided by a single vendor, data store 120 may include different listings 125 representing a single entity.

FIG. 3 illustrates an exemplary set of listings 125. Individual listings 125 may be represented by one or more database records included in data store 120. Each listing 125 may contain data or information relating to one or more listing attributes. For example, listings 125 may include one or more of the following fields: a listing identifier (ID), a Globally Unique Identifier (GUID), an advertiser name, a company name, a geographic region, a category, a description, a keyword, a date of entry, and a hyperlink. Further for example, a listing 125 may include one or more of the following listing attributes: the identity of an advertiser who is associated with the listing 125, a geographic region, one or more categories, e.g., business categories, to which the listing 125 is relevant, a description of the listing 125, text to be included in the display of the listing 125, at least one keyword that may be used to search for the listing 125, a date/time the listing 125 was added to data store 120, a hyperlink to direct a user to a particular website if the listing 125 is selected, etc.

A listing 125 may include a listing ID, an advertiser name, a geographic region, a category, a description, and a hyperlink. A listing ID is typically an automatically generated number or code that allows search engine 115 to identify a particular listing 125. An advertiser name may be a company name, a brand name, or identify some 3$^{rd}$ party advertising agency that is advertising on behalf of a company, a brand, etc. A category generally relates to the nature or subject matter of a particular listing 125, and a listing 125 may be placed into a category with other listings 125 that include similar subject matter. For example, search engine 115 may include categories such as restaurants, banks, electronics, news, shoes, watches, discounts, directions, maps, or any other category that could be used to group several listings 125 together. Listings 125 may also include a short description, such as a headline, and/or a long description, more fully describing the advertised goods and/or services, or providing additional information about a particular website. Listings 125 may also include keywords selected by an advertiser, a data source 150, or the like. In addition, listings 125 may include a key word that is selected by search engine 115. Further, listings 125 may include a hyperlink or address that can be clicked-on or otherwise selected by a user, e.g., by hovering, right-clicking, highlighting, tabbing, etc. Listings 125 may also include additional data or information as needed or desired by search engine 115, such as a bid amount, a geographic location, a performance metric, or the like.

FIG. 4 illustrates an exemplary set of search log entries 130 that may also be stored in data store 120 by one or more database records. Search log entries 130 include data about final search results 215 that are provided to a client 105 in response to a query 205, and may also include data about a user's interaction with search results 215. For example, search log entries 130 may include information such as which listings 125 were included in a set of final search results 215, to which region search results 215 are associated, and which listings may have been selected, e.g., clicked on. For example, search log entries 130 may include a listing identifier associated with each listing 125 that was provided to client 105 in response to a search query 205. Further, as shown in FIG. 4, search log entries 130 may also include information such as a time, a date, a client address, a geographic area associated with a client, a search category, a keyword, a control set identifier, a selection or click counter, etc. A control set identifier, or Set ID, may indicate that a particular control set was provided to client 105 in a set of final search results 215. Search log entries 130 may also indicate which listings 125 were provided to client 105, and may also indicate the order that the listings 125 were provided. In addition, search log entries 130 may include a rank, or position, of a particular listing 125, whether or not the listing 125 was selected (e.g. clicked-through, highlighted, hovered over, expanded, etc.), from what geographic location or region a search query was initiated, and a time or date when a search was performed. Additionally, the rank or position of a listing 125 may be stored in search log entries 130, including a rank or position of a listing 125 when that listing 125 was clicked on or selected.

Search log entries 130 may also include location information based on a keyword included in a query 205, based on client 105, or based on some other indicator. For example, a search query 205 may include such terms as "New York" or "Detroit" that may indicate a geographic location. In addition, search engine 115 may receive additional information from client 105 that can be used to associate a geographic location with client 105. For example, search engine 115 may receive an address, such as an Internet Protocol (IP) address. Search engine 115 may also selectively communicate with a location database in order to associate a received IP address with a geographic location. For example, organizations such as the American Registry of Internet Numbers (ARIN) of Chantilly, Va., maintain registration information for IP addresses that includes a physical location. Generally, search engine 115 may utilize information in listings 125 and search log entries 130 to respond to a query 205 with listings 125 that are relevant and likely to be selected or clicked on by a user.

Using search log entries 130, search engine 115, or some other computing device, may perform one or more calculations, such as how many times a listing 125 was displayed, and out of those times how many times a listing 125 was clicked on or otherwise selected. Thus, search log entries 130 may be used for the calculation of click-through rates, as well as other calculations based on the information stored in search log entries 130. Search log entries 130 may also include one or more previously calculated values, such as a click-through rate, an average click-through rate, a normalized click-through rate, or the like.

As used herein, the term "impression" refers to an appearance of a listing 125 within a set of final search results 215. "Impression count" refers to the number of impressions for that particular listing 125. Also as used herein, a "click," "selection", or a "click count" typically refers to the number of times an impression of a listing 125 is selected, e.g., clicked on, highlighted, hovered over for a pre-determined amount of time, expanded, etc. A "click-through rate" (CTR), which refers to a click count divided by an impression count, may be used to measure the performance of a listing 125. A CTR may also take into account whether a selection was made by a separate or different client or user. For example, a CTR may be defined by:

$$CTR_i = \frac{S_u}{IMP_i}$$

where $CTR_i$ represents a click-through rate of a particular listing 125 that was placed in the $i^{th}$ position in a set of search results. Typically, the particular listing of interest would be provided in the same position repeatedly in various sets of search results. $S_u$ is a "click count" of the listing, generally representing how many times a particular listing 125 was clicked on or otherwise selected by a user, and $IMP_i$ is an "impression count" corresponding to how many times the listing 125 was provided in the $i^{th}$ position in a set of final search results 215. The click count and impression count may also account for whether the listing was selected by the same user or client 105, or by separate users or clients 105.

As previously discussed, a listing 125, such as a PPC listing, may appear in different positions in a set of final search results 215. A listing 125 may also be placed in different positions depending on the set of final search results 215, e.g., a first as opposed to a fourth position in a set of five listings 125.

"CTR Normalization" refers to calculating performance metrics of PPC listings and determining a CTR that a listing would have achieved if it was displayed in a given position (generally but not necessarily the first position) every time it was included in a set of final search results 215. Thus, CTR Normalization may provide a consistent, comparable metric of PPC performance of a listing 125, regardless of the position in which the listing 125 was displayed in various sets of search results 215.

A normalized click through rate, Norm_CTR, for a particular PPC listing 125 may be defined as:

$$\text{Norm\_CTR} = \left(\sum_{i=0}^{n} \text{Avg\_CTR}_1 * CTR_i / \text{Avg\_CTR}_i\right) \Big/ n$$

where:

- $\text{Avg\_CTR}_1$ is the average click-through rate for a control set of PPC listings 125 that have been provided in a first position in a set of final search results 215. The size of this control set may be empirically determined, but the control set should be large enough to provide a meaningful sample of PPC listings 125. In addition, a control set may be used over a pre-determined period of time;
- $\text{Avg\_CTR}_i$ is the average click-through rate for a control set of PPC listings 125 that have been provided in an ith position in a set of final search results 215. The size of this control set may be empirically determined (i.e. based on an analysis of accumulated click-through-rate data), but it will be understood that the control set should be large enough to provide a meaningful sample of PPC listings 125;
- $CTR_i$ is the click-through rate of the particular PPC listing 125 of interest at the ith position; and
- n is an index of the possible positions for a listing 125, starting from position 0 (a first position in a set of final search results 215). That is, the possible number of distinct positions in a set of search results 215 that may be occupied by a listing 125 is n+1. For example, where a set of search result 215 can include a maximum of five (5) listings 125, n is four (4).

The information needed to calculate Norm_CTR for a particular PPC listing 125 will be generally obtainable by storing data relating to use of search engine 115, directory server, or the like. For example, such information may be stored in data store 120, such as in listings 125, search log entries 130, or some additional database for storing such information.

If listings 125 are organized according to various dimensions or hierarchies, e.g., a geography dimension, a category dimension, etc. it is possible to normalize click through rates within such dimensions or hierarchies. For example, a click through rate within a geography dimension may be calculated as follows:

$$\text{Norm\_CTR}_{geography} = \left(\sum_{i=0}^{n} \text{Avg\_CTR}_1 * CTR_{i,geography} / \text{Avg\_CTR}_i\right) \Big/ n$$

For example, assuming a query 205 requested a set of listings in the state of Massachusetts, the following could be calculated:

$$\text{Norm\_CTR}_{Massachusetts} = \left(\sum_{i=0}^{n} \text{Avg\_CTR}_1 * CTR_{i,Massachusetts} / \text{Avg\_CTR}_{i,Massachusetts}\right) \Big/ n$$

Moreover, a normalized click-through rate for a PPC listing 125 according to more than one dimension or hierarchy may be calculated. The following example assumes that a search query 205 has requested a PPC listings 125 in the state of Massachusetts in the category of restaurants:

$$\text{Norm\_CTR}_{Massachusetts,restaurants} = \left(\sum_{i=0}^{n} \text{Avg\_CTR}_1 * CTR_{i,Massachusetts,restaurants} / \text{Avg\_CTR}_{i,Massachusetts,restaurants}\right) \Big/ n$$

Numerous variations of the above formulae are possible. For example, different statistical values than the ones described above, e.g., median rather than average click-through rates, could be used. It will be understood that it is preferable to use the values that in practice reflect the best correlation between a normalized click-through rate and a user's selection of a PPC listing. These values may be determined through experimentation, using site traffic and/or simulations, etc.

Figure 5:
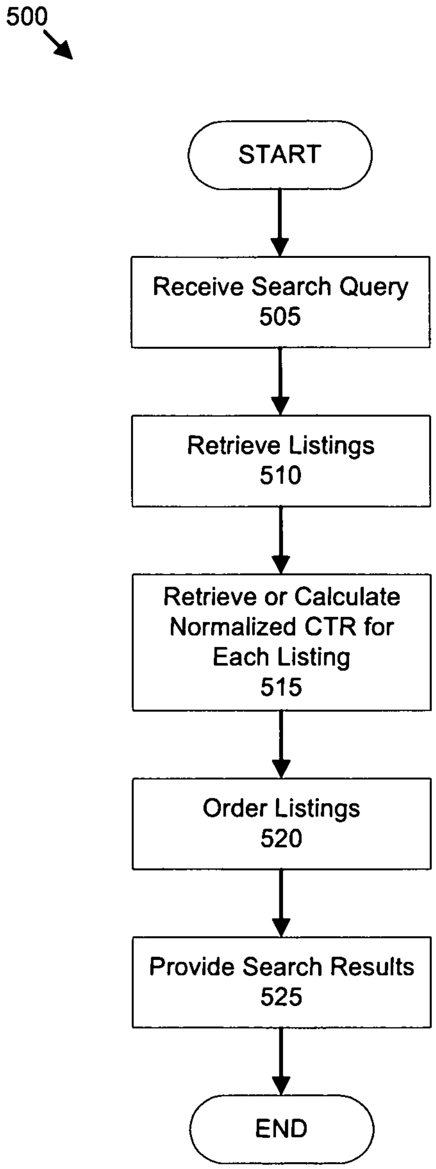
FIG. 5 illustrates an exemplary process for responding to a search query.

FIG. 5 illustrates an exemplary process 500 for responding to a search query 205. Process 500 begins in a step 505 when search engine 115 receives a search query 205. As previously discussed, a query 205 may be received from a client 105, or from some other device on behalf of client 105. Typically, a query 205 includes one or more keywords, but may also include letters, numbers, dates, times, a category, a geographic location, query language, or any additional information that search engine 115 may use to generate a response, or that might relate to one or more listings 125. In addition, a query 205 may be the result of a user selecting a hyperlink, or selecting various dimensional attributes, e.g., geographical attributes, business categories, etc. through a graphical user interface (GUI) or the like.

Next, in step 510, search engine 115 retrieves listings 125 from data store 120. Typically, search engine 115 retrieves listings based on one or more algorithms, thereby retrieving listings 125 that are relevant to the received query 205. The retrieved listings 125 typically include un-paid listings 125, as well as sponsored listings 125. Un-paid listings 125 are those that are not fee-based advertising listings 125. For example, search engine 115 may employ a spider or web crawler to search multiple data sources 150, e.g. web sites, and generate a plurality of un-paid listings 125. Sponsored listings 125, on the other hand, are typically those listings 125 that are provided by an advertiser, where an advertiser agrees to pay a fee to search engine 115 for providing the listing 125. For example, a sponsored listing 125 may be a pay-per-click listing 125.

Next, in step 515, a normalized click-through rate is identified for each of the listings 125 retrieved in step 510. Search engine 115 may retrieve or calculate a normalized CTR for each listing 125 retrieved in step 510. Such a normalized click-through rate may be calculated for a listing 125 on a periodic basis and store the normalized CTR in data store 120, such as in listings 125, search log entries 130, or in another database. However, a normalized click-through rate may be calculated for listings 125 after they are retrieved as described above in step 510. For example, it may not be practical to pre-calculate and store normalized click-through rates for listings 125 for all different possible combinations of dimensions that could include a particular listing 125 in a response to a query 205. The normalized click-through rate is typically based on an actual click-through rate that is adjusted based on which position a particular listing was provided in a set of search results or listings. In any event, the normalized click-through rate may be calculated according to one or more of the formulae set forth above.

Next, in step 520, search engine 115 orders the listings 125 retrieved in step 510. Generally PPC listings 125 are ordered according to their normalized click-through rates, where a higher normalized click-through rate merits a PPC listing 125 a higher position in the set of listings 125 retrieved in step 510 than PPC listings with lower normalized click-through rates. Further, any non-PPC listings are generally displayed after all PPC listings. Thus, listings 125 may be ordered from a most prominent, or first position, to a least prominent, or last position. A listing 125 in a more prominent position, such as the first position, is typically more likely to be selected than a listing 125 in a less prominent position. Search engine 115 may order the retrieved listings 125 such that a listing 125 with a higher normalized click-through rate receives a more prominent position than a listing 125 with a lower normalized click-through rate. Moreover, it is to be understood that factors other than normalized click-through rates may be used to order listings 125. For example, search engine 115 may use one or more of the following: a bid amount for a PPC listing; a relevancy score indicating how relevant a listing 125 is to the search query; a geographic location; a category; etc.

Next, in step 525, search engine 115 provides a set of final search results 215. The set of final search results 215 typically includes the retrieved listings 125 as ordered in step 520. A set of search results 215 may also include additional information, listings 125, banner advertisements, or the like.

Following step 525, process 500 ends.

Computing devices such as those used for client 105, search engine 115, data store 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such generally each include instructions executable by one or more computing devices such as those listed above. Various steps and processes disclosed herein may be embodied in whole or in part in such instructions. Computer-executable instructions may be compiled or interpreted from computer programs created using a variety of programming languages and/or technologies known to those skilled in the art, including, without limitation, and either alone or in combination, Java™, C, C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media and volatile media. Non-volatile media include, for example, optical or magnetic disks and other persistent memory. Volatile media include dynamic random access memory (DRAM), which typically constitutes a main memory. Such instructions may be transmitted by one or more transmission media, including coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A method, comprising:

retrieving a set of preliminary search results based on a search query, the set of search results including a plurality of pay-per-click listings;

determining a number n of different positions for each of the pay-per-click listings in which the pay-per-click listing has been provided in sets of final search results;

calculating a click-through rate $\mathrm{CTR}_i$ for each of the pay-per-click listings for each number i from zero to n;

calculating, in a computer, a normalized click-through rate for each pay-per-click listing in the set of preliminary search results, the normalized click-through rate being based on at least the click-through rate $\mathrm{CTR}_i$, average click-through rates of listings at various positions in previous sets of search results, and the number n of different positions; and ordering the plurality of pay-per-click listings based on the calculated normalized click-through rates.

2. The method of claim 1, further comprising providing at least a portion of the set of preliminary search results and at least some of the plurality of pay-per-click listings for display in a client.

3. The method of claim 1, wherein calculating a normalized click-through rate for the pay-per-click listings is performed according to the formula:

$$\mathrm{Norm\_CTR} = \left( \sum_{i=0}^{n} \mathrm{Avg\_CTR}_1 * CTR_i / \mathrm{Avg\_CTR}_i \right) \bigg/ n$$

further wherein $\mathrm{Avg\_CTR}_1$ is an average click-through rate for a first control set that includes of a plurality of pay-per-click listings that have been provided in a first position in a set of final search results, and $\mathrm{Avg\_CTR}_i$ is an average click-through rate for a second control set that includes a plurality of pay-per-click listings that have been provided in an ith position in a set of final search results.

4. The method of claim 1, wherein the number n is a location identifier that corresponds to a position in which the pay-per-click listing has been provided in a set of search results.

5. The method of claim 1, wherein the number n is a number of positions in which the pay-per-click listing has been provided in a set of search results and also selected.

6. The method of claim 1, wherein the click-through rate $\mathrm{CTR}_i$ for the pay-per-click listing is calculated by the formula:

$$CTR_i = \frac{S_u}{IMP_i},$$

wherein $S_u$ is a number corresponding to a click count, and $IMP_i$ is a number corresponding to an impression count based on the pay-per-click listing being provided in a particular position i in a set of final search results.

7. The method of claim 1, wherein the plurality of pay-per-click listings are ordered such that a pay-per-click listing with a higher normalized click-through rate receives a more prominent position than a pay-per-click listing with a lower normalized click-through rate.

8. The method of claim 1, further comprising ordering the plurality of pay-per-click listings based on the calculated normalized click-through rates and at least one of a bid amount and a category.

9. The method of claim 1, wherein ordering the plurality of pay-per-click listings further comprises selecting a position in a set of final search results for the pay-per-click listing based on the calculated normalized click-through rate.

10. A system, comprising;

a data store configured to store a plurality of pay-per-click listings and a plurality of search log entries; and a search engine configured to:

receive a search query from a client, determine a number n of different positions for each of the pay-per-click listings in which the pay-per-click listing has been provided in sets of final search results;

calculate a click-through rate $CTR_i$ for each of the pay-per-click listings for each number i from zero to n;

calculate normalized click-through rate for each of the pay-per-click listings according to click-through rate $CTR_i$, average click-through rates of listings at various positions in previous sets of search results, and the number n of different positions, and wherein the search engine is further configured to order the plurality of pay-per-click listings based on the calculated normalized click-through rates, and to provide at least some of the plurality of pay-per-click listings for display in a client.

11. The system of claim 10, wherein the search engine is further configured to calculate the normalized click-through rate for the pay-per-click listing according to the formula:

$$\text{Norm\_CTR} = \left( \sum_{i=0}^{n} \text{Avg\_CTR}_1 * CTR_i / \text{Avg\_CTR}_i \right) \Big/ n,$$

further wherein $\text{Avg\_CTR}_1$ is an average click-through rate for a first control set that includes of a plurality of pay-per-click listings that have been provided in a first position in a set of final search results, and $\text{Avg\_CTR}_i$ is an average click-through rate for a second control set that includes a plurality of pay-per-click listings that have been provided in an ith position in a set of final search results.

12. The system of claim 10, wherein the search engine is further configured to order the plurality of pay-per-click listings such that a pay-per-click listing with a higher normalized click-through rate receives a more prominent position than a pay-per-click listing with a lower normalized click-through rate.

13. The system of claim 10, wherein the search engine is further configured to order the plurality of pay-per-click listings based on the calculated normalized click-through rates and at least one of a bid amount and a category.

14. The system of claim 10, wherein the search engine is further configured to order the plurality of pay-per-click listings further comprises selecting a position in a set of final search results for the pay-per-click listing based on the calculated normalized click-through rate.

15. The system of claim 11, wherein the search engine is further configured such that the number n is a location identifier that corresponds to a position in which the pay-per-click listing has been provided in a set of final search results.

16. The system of claim 11, wherein the search engine is further configured such that the number n is a number of positions in which the pay-per-click listing has been provided in a set of search results and also selected.

17. A computer-readable medium tangibly embodying computer-executable instructions for:

retrieving a set of preliminary search results based on a search query, the set of search results including a plurality of pay-per-click listings;

determining a number n of different positions for each of the pay-per-click listings in which the pay-per-click listing has been provided in sets of final search results;

calculating a click-through rate $CTR_i$ for each of the pay-per-click listings for each number i from zero to n;

calculating, in a computer, a normalized click-through rate for each pay-per-click listing in the set of preliminary search results, the normalized click-through rate being based on at least the click-through rate $CTR_i$, average click-through rates of listings at various positions in previous sets of search results, and the number n of different positions; and ordering the plurality of pay-per-click listings based on the calculated normalized click-through rates.

18. The computer-readable medium of claim 17, further including instructions for providing at least a portion of the set of preliminary search results and at least some of the plurality of pay-per-click listings for display in a client.

19. The computer-readable medium of claim 17, wherein calculating a normalized click-through rate for the pay-per-click listings is performed according to the formula:

$$\text{Norm\_CTR} = \left( \sum_{i=0}^{n} \text{Avg\_CTR}_1 * CTR_i / \text{Avg\_CTR}_i \right) \Big/ n,$$

further wherein $\text{Avg\_CTR}_1$ is an average click-through rate for a first control set that includes of a plurality of pay-per-click listings that have been provided in a first position in a set of final search results, and $\text{Avg\_CTR}_i$ is an average click-through rate for a second control set that includes a plurality of pay-per-click listings that have been provided in an ith position in a set of final search results.

20. The medium of claim 17, wherein the plurality of pay-per-click listings are ordered such that a pay-per-click listing with a higher normalized click-through rate receives a more prominent position than a pay-per-click listing with a lower normalized click-through rate.

* * * * *

UNITED STATES PATENT AND TRADEMARK OFFICE

CERTIFICATE OF CORRECTION

PATENT NO. : 8,898,131 B1
APPLICATION NO. : 12/031098
DATED : November 25, 2014
INVENTOR(S) : Yankang Jiang et al.

It is certified that error appears in the above-identified patent and that said Letters Patent is hereby corrected as shown below:

In the Claims

Col. 10, in claim 3, line 41, it should appear with a --,-- after the formula.

Replace "

$$Norm\_CTR = \left( \sum_{i=0}^{n} Avg\_CTR_1 * CTR_i / Avg\_CTR_i \right) / n$$

"

with --

$$Norm\_CTR = \left( \sum_{i=0}^{n} Avg\_CTR_1 * CTR_i / Avg\_CTR_i \right) / n,$$

--.

Col. 10, in claim 6, line 60, "The method of claim 1, wherein the click-through rate CTR," should read -- The method of claim 1, wherein the click-through rate $CTR_i$ --.

Col. 11, in claim 10, line 29, replace "pay-per-click listings according to click-through rate" with -- pay-per-click listings according to at least the click-through rate --.

Signed and Sealed this
Seventh Day of April, 2015

Michelle K. Lee
*Director of the United States Patent and Trademark Office*